United States Patent [19]

Courty

[11] 4,438,562

[45] Mar. 27, 1984

[54] MANUAL PIPE CUTTER

[76] Inventor: Aurèle Courty, 471 Ste. Madeleine St., Montreal, Canada, H3K 2K8

[21] Appl. No.: 405,943

[22] Filed: Aug. 6, 1982

[51] Int. Cl.³ .............................................. B23D 21/06
[52] U.S. Cl. ........................................... 30/99; 30/101
[58] Field of Search ............................ 30/101, 102, 99

[56] References Cited

U.S. PATENT DOCUMENTS

| | | | |
|---|---|---|---|
| 1,699,027 | 1/1929 | Scott | 30/99 |
| 2,379,177 | 6/1945 | Pavey | 30/99 |
| 3,290,779 | 12/1966 | Bridges | 30/101 X |
| 3,807,047 | 4/1974 | Sherer | 30/101 X |
| 4,157,615 | 6/1979 | Courty | 30/99 |
| 4,177,557 | 12/1979 | Courty | 30/99 |

Primary Examiner—Jimmy C. Peters

[57] ABSTRACT

A manual pipe cutter that comprises a cutting disk and a cutter-pressing jaw to press the cutting disk edgewise against a pipe to cut it, and is characterized by a push-button and gear arrangement for convenient operation and forceful pressing of the cutting disk edgewise against the pipe. This manual pipe cutter further comprises a body defining a cutting head portion and a handle portion, a cutting head rotatable in the cutting head portion of the body and cooperatively forming with it a pipe passage and an open mouth to position a pipe transversely into the pipe passage, a pawl and ratchet to rotate the cutting disk around the pipe, and means to release the movable jaw and return it to its outermost position.

11 Claims, 17 Drawing Figures

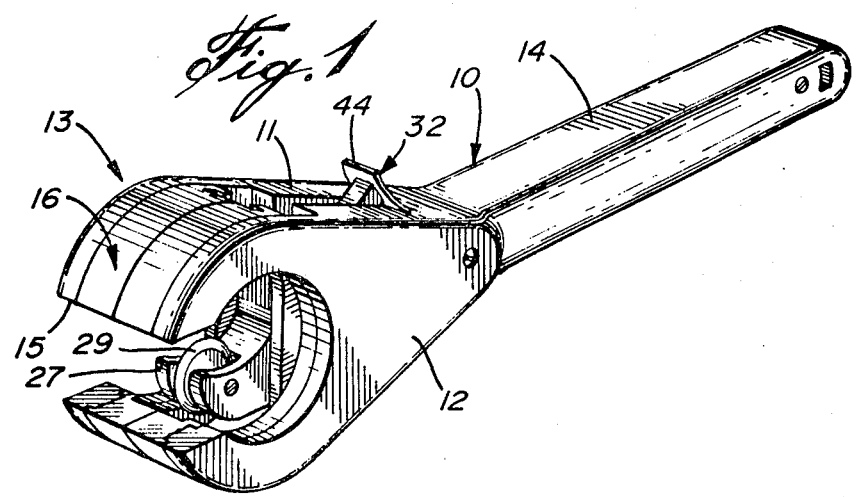
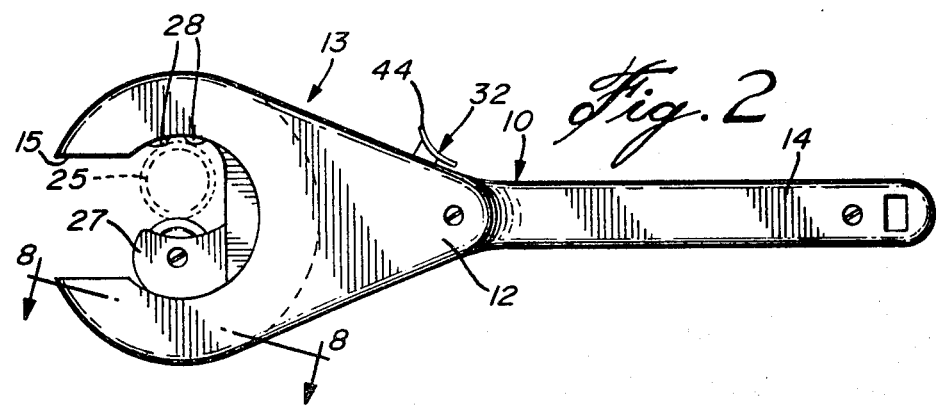
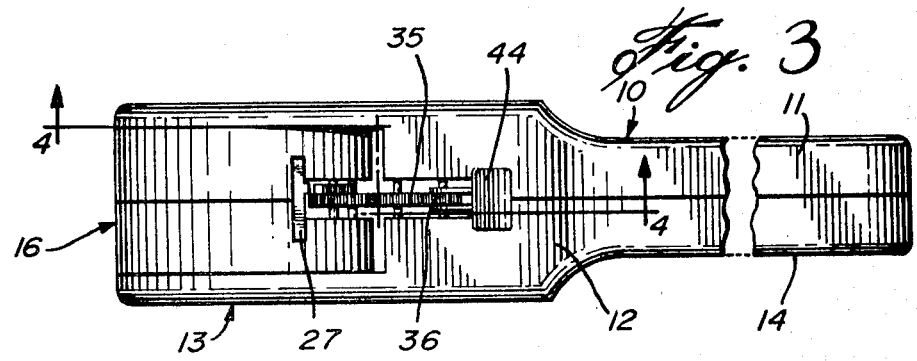

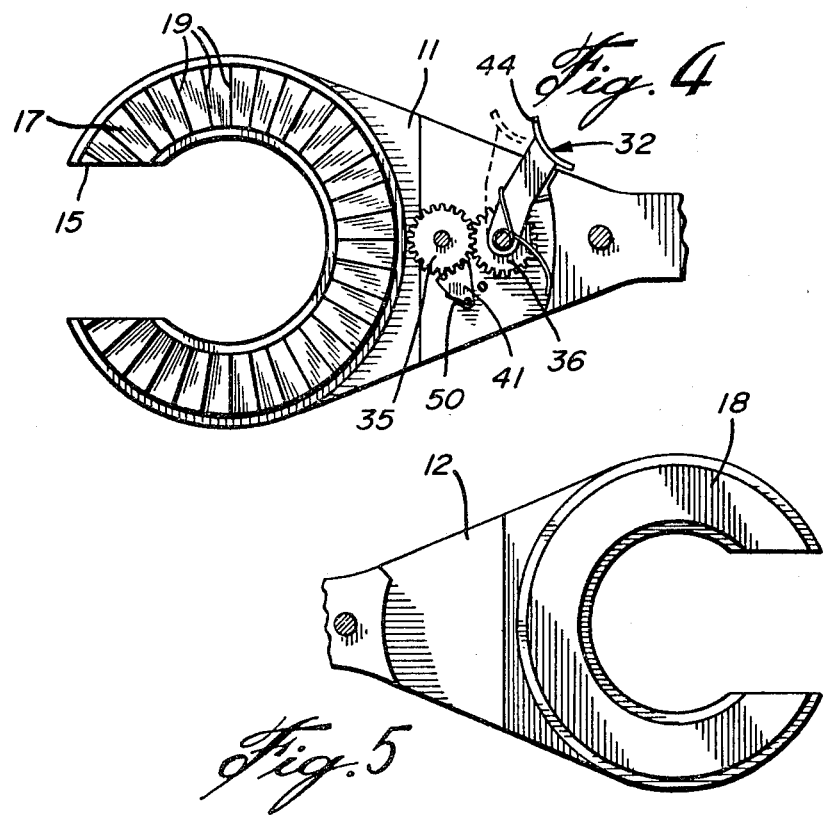
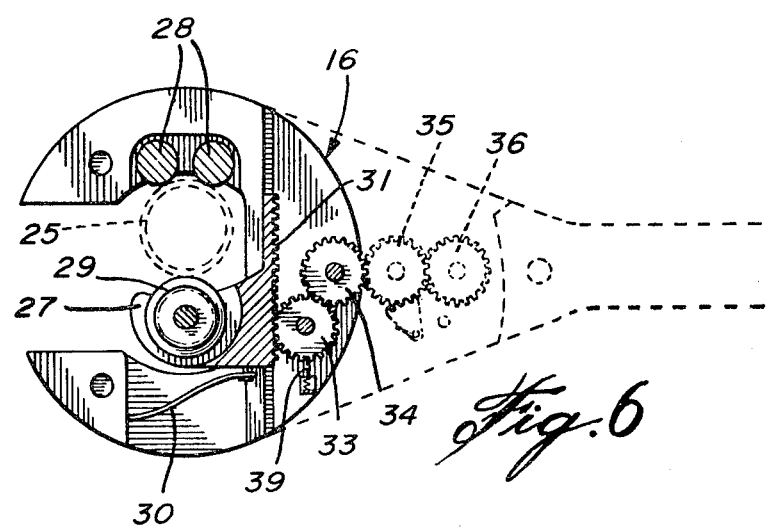

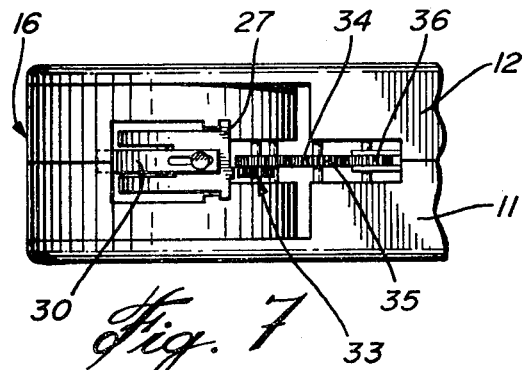
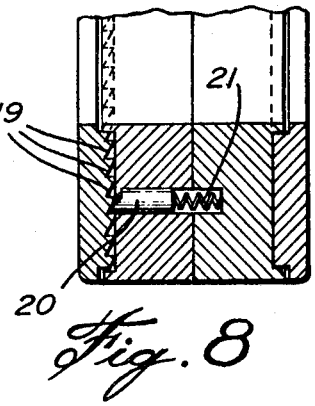
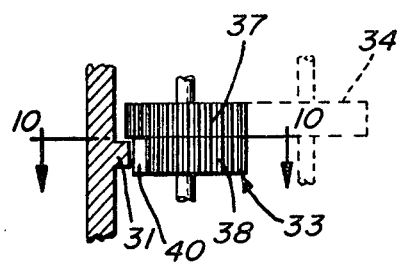
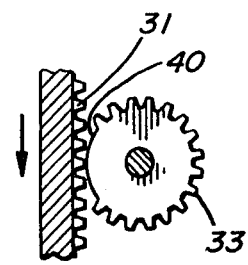
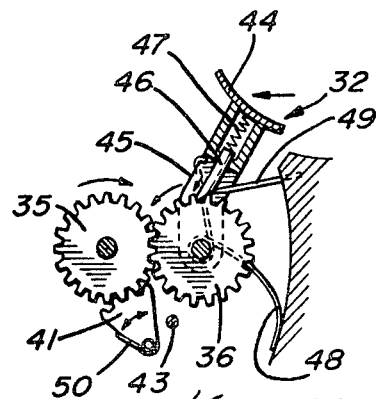
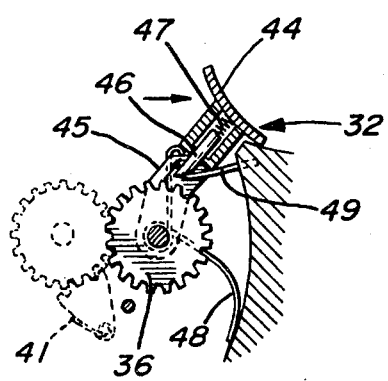

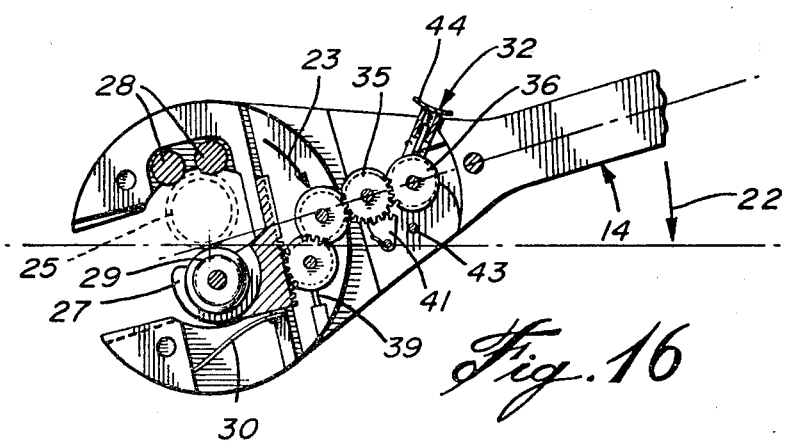
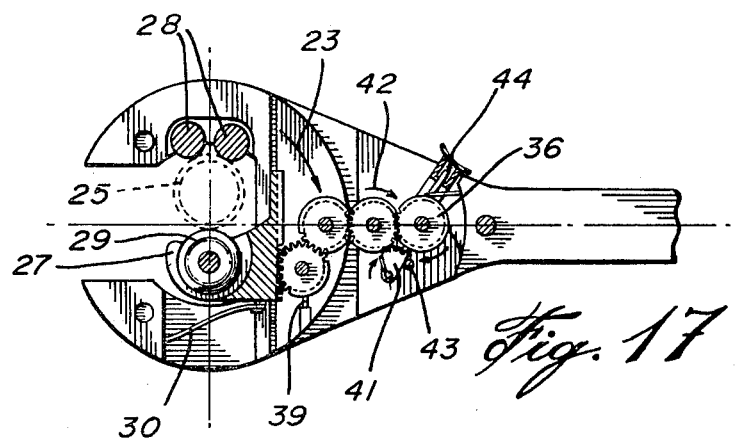

MANUAL PIPE CUTTER

FIELD OF THE INVENTION

This invention relates to a pipe cutter of the hand tool type.

DESCRIPTION OF THE PRIOR ART

Manual pipe cutters of the above type are conventionally made with at least one cutting disk, a cutter-pressing jaw to press the cutting disk edgewise against a pipe to cut it and a screw and knob arrangement to progressively displace the cutter-pressing jaw to so press the cutting disk.

SUMMARY OF THE INVENTION

It is a general object of the present invention to provide a manual pipe cutter of improved construction and more efficient operation.

It is a more specific object of the present invention to provide a manual pipe cutter which includes a relatively more easily-operated arrangement to progressively displace the cutter-pressing jaw, in alternative to the above-mentioned screw and knob arrangement, the arrangement of the invention also occupying less room so that a pipe may be cut even when very close to an obstruction.

It is an object of the present invention to provide a manual pipe cutter which includes a pushbutton and gear arrangement for convenient operation and strong pressing of a cutting disk edgewise against a pipe to cut it.

BRIEF DESCRIPTION OF THE DRAWINGS

The above and other objects and advantages of the present invention will be better understood with reference to the following detailed description of a preferred embodiment thereof which is illustrated, by way of example, in the accompanying drawings, in which:

FIG. 1 is a perspective view of a manual pipe cutter according to the present invention;

FIG. 2 is a side view of the same manual pipe cutter;

FIG. 3 is a top view of the same manual pipe cutter;

FIG. 4 is a cross-sectional view of the head portion of the pipe cutter as seen along line 4—4 in FIG. 3;

FIG. 5 is a cross-sectional view as in FIG. 4, but looking in the opposite direction relative to the arrows in FIG. 3;

FIG. 6 is a side view of the cutting head forming part of the illustrated manual pipe cutter;

FIG. 7 is a bottom view of the head portion of the same pipe cutter;

FIG. 8 is a cross-sectional view as seen along line 8—8 in FIG. 2;

FIG. 9 is a top view of a gear arrangement with an associated rack shown in cross-section and forming part of the pipe cutter;

FIG. 10 is a cross-sectional view as seen along line 10—10 in FIG. 9;

FIGS. 11 and 12 are side views of a pushbutton and associated gears forming part of the same pipe cutter to progressively increase the bite of the cutter into the pipe being cut; and FIGS. 13 to 17 inclusive are schematic side views illustrating the sequence of operation of the manual pipe cutter shown in more detail in the preceding Figures.

DETAILED DESCRIPTION OF THE PREFERRED EMBODIMENT

The illustrated manual pipe cutter comprises a body 10, made of two halves 11 and 12 cooperatively forming a cutting head portion at 13 and a handle portion at 14. The cutting head portion 13 defines a pipe passage extending transversely through it and has a cutout at 15 forming an open mouth communicating transversely with the pipe passage to allow relative transverse displacement of a pipe inward into the pipe passage in the cutting head portion.

Figure 14:
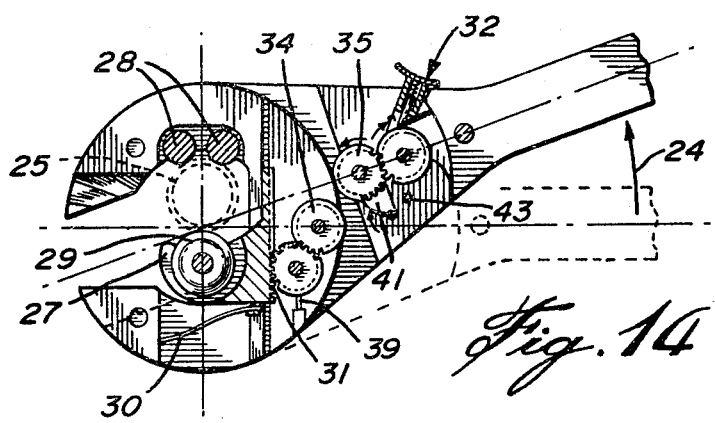

A cutting head 16 is rotatably mounted in the cutting head portion between the corresponding cutting head portions of the spaced-apart halves 11 and 12 of the body 10. Thus, the cutting edge portions of the two halves of the body define a pair of inner faces 17 and 18 which are mutually facing each other and engage the opposite sides respectively of the cutting head 16. The inner face 17 is formed with ratchet teeth 19 serially arranged circularly around the pipe passage. As shown in FIG. 8, a bore extends tranversely into the cutting head from the face adjacent the ratchet teeth 19. A pawl, in the form of a pin 20, is slidable in that bore and is outwardly biased by a spring 21, such that its outer pointed end operatively abuts against the adjacent tooth 19. The ratchet teeth 19 and the pawl 20 are constructed and arranged such that, when the handle 14 is lowered in the direction of the arrow 22, as shown in FIG. 16, the body 10 rotates the cutting head in the clockwise direction, as shown by the arrow 23. When the handle 14 is pivoted in the direction of the arrow 24, as shown in FIG. 14, the pawl 20 and ratchet teeth 19 allow the body 10 to idly pivot relative to the cutting head 16, such as when the latter bites a pipe 25. Thus, the reciprocative pivoting of the handle 14, as shown by the arrow 26, causes only unidirectional rotation of the cutting head 16 in the direction of the arrow 23, as shown in FIG. 16. The cutting head 16, as the head portion 13, is provided with a pipe passage and a cutout forming an open mouth to insert the cutter endwise around the pipe 25 to be cut.

A cutter-pressing jaw 27 is slidably mounted on the cutting head and is slidable in a predetermined direction transversely relative to the pipe passage and to the open mouth of the cutting head. A pair of guide rollers 28 are rotatively carried by the cutting head diametrically opposite to the cutter-pressing jaw 27 relative to the pipe passage. This allows operative displacement of the jaw toward the rollers to hold a pipe 25 between the rollers 28 and a cutting disk 29 carried by the jaw. The cutting disk 29 is arranged to engage the pipe 25 edgewise to cut it transversely. A blade spring 30 is fixed at one end to the cutting head and at its other end to the cutter-pressing jaw 27 and is made and arranged to retract the latter in opposite direction away from the rollers 28.

A toothed rack 31 is fixed to the cutter-pressing jaw 27 and is bodily slidable endwise in the direction of the rollers 28. A pushbutton and gear arrangement is provided to progressively displace or slide the jaw 27 in the direction of the rollers 28 as the cutting operation progresses. The pushbutton and gear arrangement includes a pushbutton 32 and a ratchet and gear system operatively connecting the pushbutton 32 to the toothed rack and arranged for controlled operation of the same.

The ratchet and gear system includes a first pair of gears 33 and 34 carried by the rotatable cutting head 16 and a second pair of gears 35 and 36 carried by the body 10 and displaceable with it translatively. The gears 33 and 34 are in meshing engagement one with the other and are translatively rotatable with the rotatable cutting head. The gear 33 is a double-toothed wheel or gear including one axial side 37 that drives the other axial side 38 bodily with it. The toothed wheel or gear forms a ratched wheel 37 which meshes with the gear 34. A pin 39 is carried by the rotatable cutting head 16 and is spring biased into engagement as a pawl between a pair of teeth of the side 37 of the double gear. This forms a pawl and ratchet assembly to allow only unidirectional rotation of the gears. The side 38 of the double gear 33 has a couple of teeth removed, thus forming a non-toothed circumferential portion 40 that produces a detent to release the toothed rack 31 and allow the jaw to be retracted by the spring blade 30 away from the rollers 28 at the end of one cut through a pipe 25.

The gears 34 and 35 form intermediate connection gears which mesh one with the other cyclically; that is, only when for each rotation of the cutting head 16, the latter has its mouth registering with the mouth of the head portion 13. Then gears 35 and 36 mesh one with the other. A gear sector 41 meshes with the intermediate connection gear 35 and is pivoted to produce a pivotable pawl to block the gears 35 and 36 against rotation in the direction opposite to the direction indicated by the arrow 42 in FIG. 17 during a portion of the cycle of operation. This is done by abutment of the gear sector 41 with a pin 43.

The pushbutton 32 includes a pushbutton head 44 which is secured at the outer end of an arm 45 that is pivoted at its other end around the axis of the gear 36. The pushbutton also includes a plunger 46 that is biased by a spring 47 toward pawl-like engagement with an adjacent tooth of the gear 36. A spring wire 48 engages the pivotable arm 45 to bias the same angularly away from engagement of the plunger 46 with a tooth of the gear 36. The plunger 46 is shaped to be wedged away from the gear 36 upon abutment with a blade 49.

Figure 13:
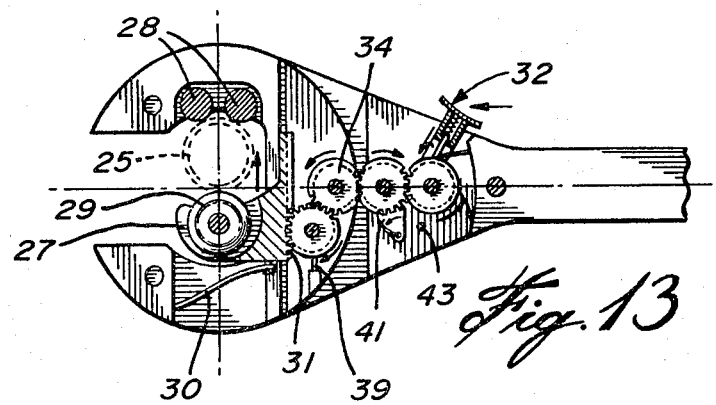
Figure 15:
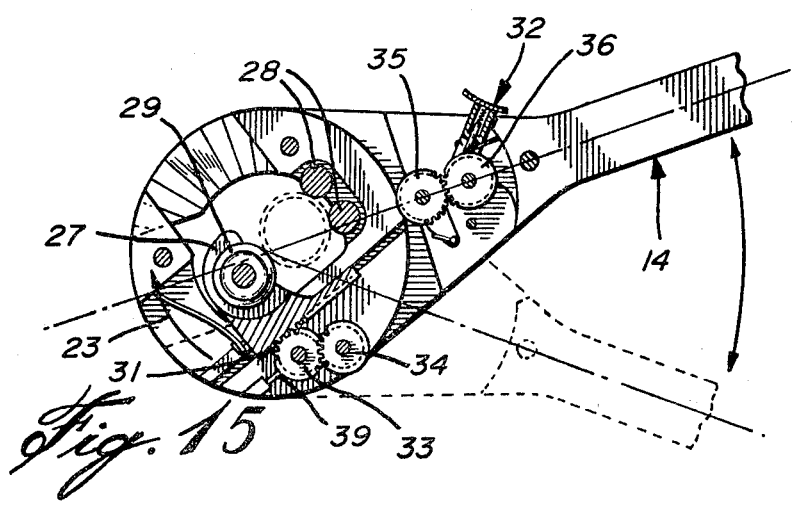

By pushing on the head 44 of the arm 45, the gear 36 is rotated and this also rotates the gears 35, 34, and 33 and pivots the gear sector 41 away from the abutment pin 43, as shown by the arrows in FIG. 13. Then, the cutter-pressing jaws 16 16 slide toward the rollers 28 and the cutting disk 29 can thus cut deeper into the pipe 25. When the head 44 of the arm 45 is released, the plunger 46 frees the gear 36. Upward pivoting of the handle 14 frees the gear 35 and the spring wire 50 of the gear sector 41 then pivots the latter until its abutment with the pin 43; this is shown by the arrows in FIG. 14. As afore mentioned, the up-and-down pivoting of the handle 14, as indicated by the arrow 26, causes rotation of the cutting head 16 and of the cutting disk 29 in the direction of the arrows 23 around the pipe to cut it; this is shown in FIG. 15. As shown in FIG. 16, when a turn of the cutting head has been completed, the connection gears 34 and 35 mesh again one with the other to repeat the operation of the arm 45 to further slide the jaw 27 toward the rollers 28. FIG. 17 shows the movements occurring upon release of the head 44 and by action of the spring wire 50 on the gear sector 41. As mentioned, when the jaw 27 has reached the end of its course toward the rollers 28, the non-toothed portion 40 of the gear 33 registers with the toothed rack 31 and the jaw 27 is returned by the spring 30 to its starting position.

What I claim is:

1. A manual pipe cutter comprising a body including a cutting head portion having a pipe passage extending therethrough, a cutting head rotatable in the cutting head portion substantially around the pipe passage, a cutter-pressing jaw mounted on the cutting head and displaceable in a predetermined direction transversely across relative to the pipe passage, a toothed rack fixedly secured to the cutter-pressing jaw and displaceable bodily with the latter and endwise in said predetermined direction, a ratchet and gear system connected to the toothed rack and constructed and arranged to move and hold the latter relative to operative displacement of the cutter-pressing jaw in said predetermined direction, and a manual actuator mounted on said body, connected to the ratchet and gear system and constructed and arranged to actuate the same and produce the operative displacement of the cutter-pressing jaw in said predetermined direction.

2. A manual pipe cutter as defined in claim 1, wherein the ratchet and gear system includes at least one toothed wheel operatively connected intermediate the manual actuator and the toothed rack and constructed and arranged to operatively drive the latter in said predetermined direction, a pawl operatively holding the toothed rack and cutter-pressing jaw against bodily displacement in opposite direction relative to said predetermined direction, and a detent device constructed and arranged to release the toothed rack of backward displacement in said opposite direction.

3. A manual pipe cutter as defined in claim 2, wherein the manual actuator includes a pushbutton operatively connected to said one ratchet wheel and selectively rotating the same upon actuation, to produce the operative displacement of the cutter-pressing jaw in said predetermined direction.

4. A manual pipe cutter as defined in claim 3, wherein the detent device includes a second toothed wheel bodily rotatable with said one toothed wheel, operatively meshing with the toothed rack, and having a non-toothed circumferential portion unmeshing the second toothed-wheel from the toothed rack upon cyclic rotation into registration therewith, thereby producing detent of the toothed rack for the backward displacement thereof.

5. A manual pipe cutter as defined in claim 4, wherein the ratchet and gear system includes a first pair of gears and a second pair of gears, the first pair of gears is mounted on the cutting head and is translatively rotatable therewith, the second pair of gears is mounted on said body operatively between the pushbutton and the first pair of gears, and each of said pairs of gears includes one intermediate connection gear selectively meshing with the intermediate connection gear of the other pair of gears upon cyclic registration of the two pairs of gears produced by rotation of the cutting head relative to said body.

6. A manual pipe cutter as defined in claim 5, wherein the ratchet and gear system includes a gear sector pivotable adjacent the intermediate connection gear of the second pair of gears and forming a pivotable pawl operatively holding the intermediate connection gear of the second pair of gears fixedly in the path of displacement of the intermediate connection gear of the first pair of gears and constructed and arranged for operative meshing together of the intermediate connection gears.

7. A manual pipe cutter as defined in claim 6, wherein the pushbutton includes a head, a spring-biased plunger operatively pushed against a tooth of the other gear of the second pair of gears and operatively rotating the latter upon pushing on the pushbutton head.

8. A manual pipe cutter as defined in claim 7, wherein a cutting disk is carried by the cutter-pressing jaw and the latter is slidably mounted on the cutting head and slidable in said predetermined direction toward edgewise cutting engagement against a pipe positioned in the pipe passage.

9. A manual pipe cutter as defined in claim 8, wherein the cutting head portion forms a pair of spaced-apart inner faces mutually facing each other and extending around the pipe passage, on opposite sides of the cutting head, one face is formed with ratchet teeth serially and operatively arranged around the pipe passage, and a pawl is mounted on the cutting head, biased into operative engagement with the teeth of the ratchet teeth of said one face and constructed and arranged to allow pawl and ratchet control of the rotation of said body around the cutting head.

10. A manual pipe cutter as defined in claim 9, wherein the cutting head, of generally annular configuration, extends annularly around the pipe passage, has a cutout forming a radially-extending open mouth operatively registering with the open mouth of the cutting head portion, and includes a pair of guide rollers rotatively mounted thereon for guiding engagement with a pipe positioned lengthwise into the pipe passage.

11. A manual pipe cutter as defined in claim 10, wherein the cutting head includes a spring operatively engaging the cutter-pressing jaw and operatively biases the same in said opposite direction away from the guide rollers.

* * * * *